United States Patent
Rivest et al.

(10) Patent No.: US 7,716,124 B2
(45) Date of Patent: May 11, 2010

(54) METHOD AND SYSTEM FOR ASSISTING A CLIENT IN THE TRANSFER OF USAGE OF ACCOUNTS AT ONE OR MORE FINANCIAL INSTITUTIONS

(75) Inventors: Serge Rivest, Mississauga (CA); Michael King, Aurora (CA); Richard Clark, Markham (CA)

(73) Assignee: Davis + Henderson, Limited Partnership, Toronto (CA)

( * ) Notice: Subject to any disclaimer, the term of this patent is extended or adjusted under 35 U.S.C. 154(b) by 711 days.

(21) Appl. No.: 11/219,856

(22) Filed: Sep. 7, 2005

(65) Prior Publication Data
US 2007/0055594 A1 Mar. 8, 2007

(30) Foreign Application Priority Data
Sep. 1, 2005 (CA) .................................... 2518010

(51) Int. Cl.
*G06Q 40/00* (2006.01)
(52) U.S. Cl. .......................................... 705/38; 705/35
(58) Field of Classification Search ................ 705/38
See application file for complete search history.

(56) References Cited

U.S. PATENT DOCUMENTS

| | | | |
|---|---|---|---|
| 5,825,003 A | 10/1998 | Jennings et al. | |
| 6,128,603 A | * 10/2000 | Dent et al. | 705/40 |
| 7,206,768 B1 | 4/2007 | deGroeve et al. | |
| 2002/0029194 A1 | 3/2002 | Lewis et al. | |
| 2002/0082987 A1 | 6/2002 | Wilson | |
| 2002/0116335 A1 | 8/2002 | Star | |
| 2003/0225642 A1 | 12/2003 | Baker et al. | |
| 2004/0230523 A1 | 11/2004 | Johnson | |
| 2007/0061260 A1 | 3/2007 | deGroeve et al. | |

OTHER PUBLICATIONS

Mueller, Karin Price; "online, money managerment" ISBN: 0-7356-1111-4, 2001.*

* cited by examiner

*Primary Examiner*—Kirsten S Apple
(74) *Attorney, Agent, or Firm*—Lang Michener LLP

(57) ABSTRACT

A system and method of assisting a client transfer financial services using a first account to a second account collects relevant information and authorization from the client. The system and method maintains a database of counterparties providing services to clients of financial institutions and uses the information provided by the client and information in the database of counterparties to schedule and effect the transfer of the services. The system and method creates the necessary transfer information for each service to be transferred and dispatches the completed transfer information to each counterparty with a desired date for the transfer to be effected, the desired dates being selected in accordance with a cashflow analysis performed by the system and method of both the account at the previous financial institution and the account at the new financial institution.

16 Claims, 6 Drawing Sheets

METHOD AND SYSTEM FOR ASSISTING A CLIENT IN THE TRANSFER OF USAGE OF ACCOUNTS AT ONE OR MORE FINANCIAL INSTITUTIONS

FIELD OF THE INVENTION

The present invention relates to a system and method for assisting a client in the transfer of usage of accounts at one or more financial institutions. More specifically, the present invention relates to a system and method which assists a client to transfer the various services using a first account to a second account which can be at the same, or another, financial institution.

BACKGROUND OF THE INVENTION

The financial industry has undergone significant changes in the last ten years. In addition to traditional banks, trust companies and other conventional financial institutions, many new financial institutions and categories of financial institutions have been created. These many financial institutions have accordingly become increasingly competitive in acquiring clients and make significant efforts to acquire new clients from other, competitor, institutions. Significant marketing efforts, discounts, service bundles and other incentives are employed by financial institutions to attract new clients, often from their competitors.

At the same time as the financial institutions have become more competitive in acquiring clients, the array of services that financial institutions offer their clients has increased and can include a bewildering array of services, including automated payments of utility company and other bills of the client, investment and money management services, automated transfers between accounts and/or institutions, etc. Also, financial institutions have introduced new services for their existing clients in efforts to retain those clients, increase profitability and/or expand the range of services offered by the financial institution. Further, many non-financial service providers have established interfaces to financial institutions which allow them to directly debit or credit their client's accounts with the financial institution.

As a consequence of the wide array of services available to the clients of financial institutions, a client may have a great deal of difficulty and/or inconvenience in transferring their existing services, including pre-authorized payments, credits and even their payroll, from an existing account to a new account, at the same financial institution or at a new institution. Thus, despite the above-mentioned significant efforts expended by a financial institution to attract new clients and/or retain existing clients, the inconvenience and effort required by the client to transfer and/or reestablish existing services for a new account can be such a significant disincentive that the client will not establish the new account and/or move to a new financial institution.

It is desired to have a system and method for assisting a client to transfer and/or reestablish the financial services using a first account at a financial institution to a second account at a financial institution, whether the same financial institution or a new financial institution.

SUMMARY OF THE INVENTION

It is an object of the present invention to provide a novel system and method for assisting clients to transfer financial services using a first account to instead use a second account which obviates or mitigates at least one disadvantage of the prior art.

According to a first aspect of the present invention, there is provided a method of assisting a client to transfer financial services using a first account to use a second account, the method comprising the steps of: (i) obtaining authorization from the client to effect the transfers on the behalf of the client; (ii) obtaining an identification of the services to be transferred and the counterparty which provides each identified service; (iii) determining for each counterparty and each service the desired date upon which to effect the transfer; (iv) for each counterparty, preparing a suitable transfer document to effect transfer of the respective service, each transfer document identifying the service to be transferred, the client, the second account, the desired date for the transfer and providing authorization from the client; and (v) dispatching each prepared transfer document to the respective counterparty.

Preferably, step (iii) further comprises the step of maintaining and using a database of counterparties, the database including a definition of the information and information and formats required by the counterparty and an indication of any lead time required by the counterparty to effect a transfer.

According to another aspect of the present invention, there is provided a system for assisting a client to transfer financial services using a first account to a second account, comprising: a data cross referencing system operable to receive and maintain information identifying the client, the first account, the second account, the services to be transferred and the authorization of the client to effect the desired transfers; a counterparty database operable to maintain and provide counterparty information regarding the counterparties providing each service to be transferred for the client, the counterparty information identifying the information required by the respective counterparty to effect a transfer and an indication of any mandatory lead time required by the counterparty to effect a transfer, the data cross referencing system accessing the counterparty database to verify information received from the client relating to each service to be transferred; a cashflow engine operable to examine each service to be transferred and the date the service debits or credits the account of the client, the cashflow engine determining for each service to be transferred a desired date for the transfer to be effected, the determined date being selected to avoid undesirable cashflow spikes or interruptions in both the first account and the second account; and a transfer engine operable to create the transfer information required by each respective counterparty to effect the desired transfers, the transfer information being populated by the transfer engine with the appropriate information from the data cross referencing system and the desired date determined by the cashflow engine and the authorization received by the data cross referencing system from the client, and to dispatch the created transfer information to the respective counterparties.

The present invention provides a system and method of assisting a client transfer financial services using a first account to a second account. The first and second accounts can be at the same financial institution, or at different financial institutions and the system and method collects relevant information and authorization from the client and maintains a database of counterparties providing financial services. The system and method uses the information provided by the client or financial institution and the information in the database of counterparties to schedule and effect the transfer of the services. The system and method creates the necessary transfer information, in paper or electronic form, for each service to be transferred and dispatches the completed transfer information to each counterparty with a desired date for the transfer to be effected, the desired dates being selected in accordance with a cashflow analysis performed by the system and method of both the first and second accounts.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
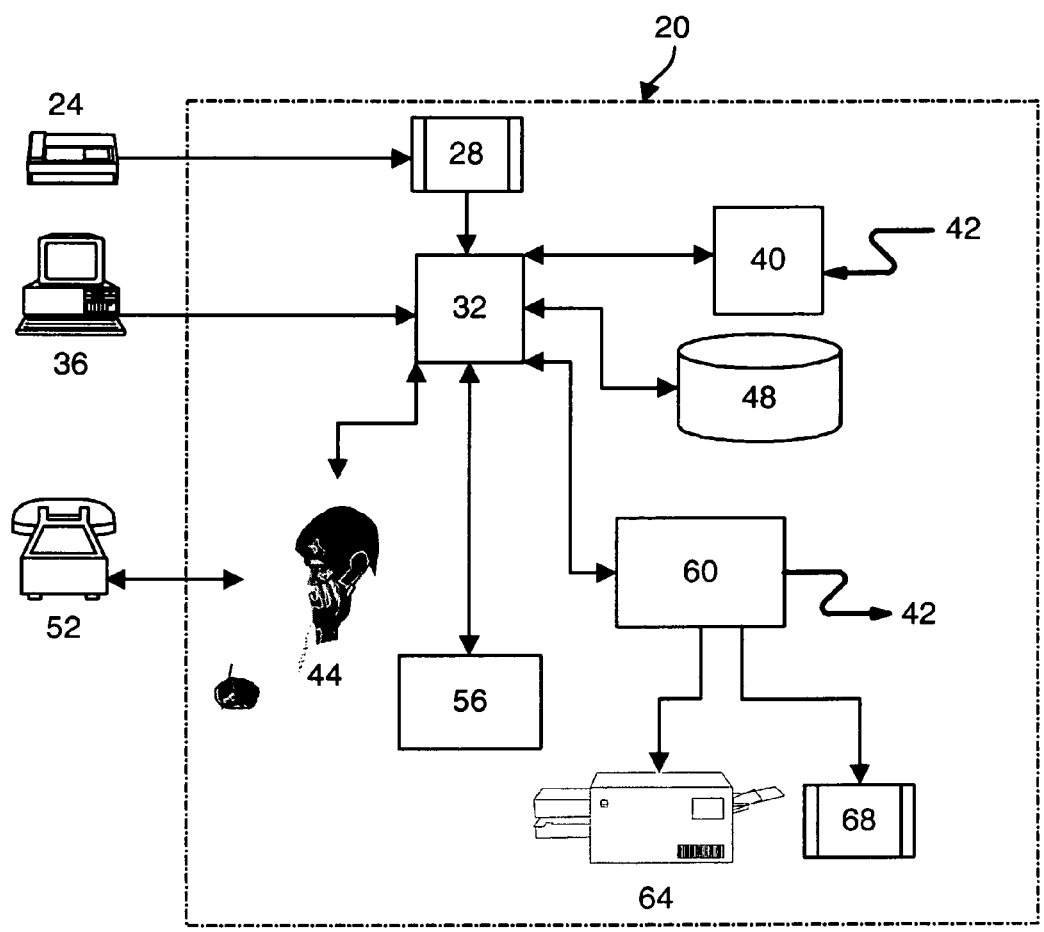
FIG. 1 shows a schematic representation of a system in accordance with the present invention.
Figure 2:
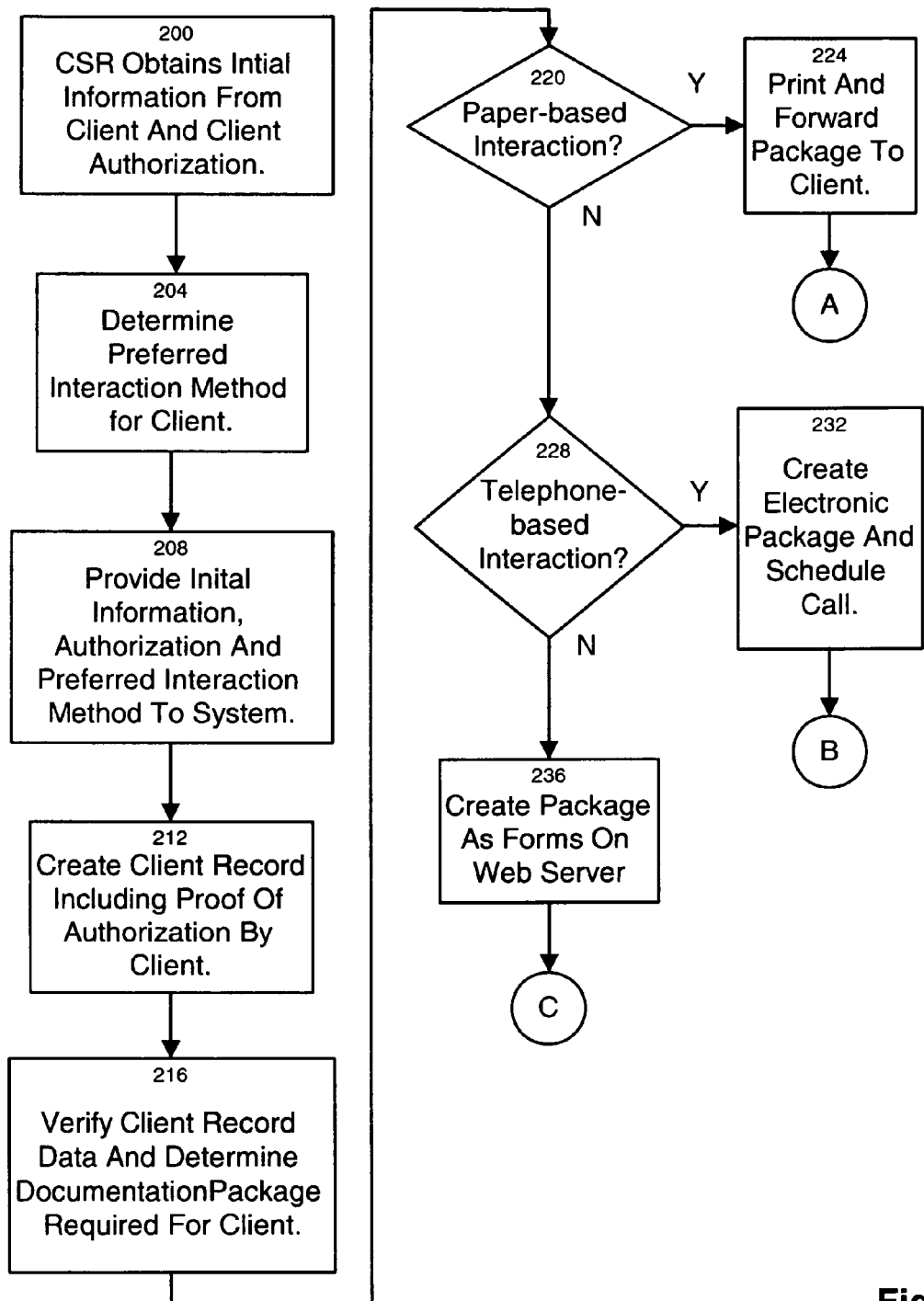
FIG. 2 shows a flowchart illustrating the initial steps of a method in accordance with the present invention.

A system for assisting a financial institution client to transfer the financial services using a first account to use a second account is indicated generally at 20 in FIG. 1 and a method in accordance with the present invention is indicated in the flowcharts of FIGS. 2 through 6. It is contemplated that system 20 will typically be operated by a third party service organization and financial institutions will retain the services of the third party service organization as necessary, but is also contemplated that a financial institution itself can operate system 20.

In the following discussion, it is assumed that the first account is at a first (old) financial institution and that the second account is at a second (new) financial institution, but the present invention is not so limited and both the first and second account can be at a single financial institution, albeit being at different branches of the financial institution and/or being different types of account (i.e. —chequing account, investment or money market account, etc.). Further, as used herein, the term "account" is intended to comprise any financial account that can be maintained for a client and includes, without limitation, chequing accounts, savings accounts, money market or investment accounts, credit card accounts, line of credit accounts, etc.

To commence the process of transferring services of a client from a first account to a second account, system 20 must be provided with the necessary client information and the authorization of the client.

In a present embodiment, the client initiates the method of the present invention with the assistance of a client service representative ("CSR") of the financial institution offering the second account (hereinafter the "new financial institution") often, but not necessarily, as part of the process of opening the second account and/or subscribing to new services of the financial institution. Specifically, at step 200, the CSR obtains the initial information required to commence the method from the client. As described in more detail below, this initial information can comprise the client's name, address, contact information such as telephone numbers and/or email addresses and the identity of the financial institution and/or branch that the services are being transferred from (hereinafter the "old financial institution").

To complete step 200 the CSR also obtains authorization from the client to authorize the financial institution operating the second account and/or the third party operator of system 20, to act as the client's agent in instructing service providers and the financial institution operating the first account to effect the transfer of the financial services to the second account. It is contemplated that this authorization will most commonly be a signed client authorization form, although other methods of obtaining authorization, including audio recordings of client authorizations, capturing PIN's, etc., can be employed instead, or in addition, as desired.

As will be apparent to those of skill in the art, the present invention is not limited to the client initiating the method with a CSR and any other manner of initiating the method, such as by telephone contact to the service organization, or web-based contact, can also be employed and the client authorization can be faxed, input or otherwise provided to the operator of the method.

At step 204, the CSR determines the client's preferred method of further interaction with system 20. Specifically, in order to enhance the convenience to a client being assisted by system 20, it is presently preferred that system 20 be able to interact with the client in a variety of manners. Presently, system 20 supports a paper-based interaction, an outbound telephone call-based interaction, and an internet/web-based interaction, although other interaction methods are also contemplated and the present invention is not limited to the interactions specifically discussed herein.

At step 208, the CSR provides the initial information, the Client Authorization and the client's preferred method of interaction to system 20. The method of providing this information is not particularly limited and can be achieved in a variety of manners. For example, the CSR can complete paper forms with the necessary information thereon and can fax these paper-based forms to system 20, as described in more detail below.

Alternatively, the CSR can input the initial information and the client's preferred method of interaction into a data entry system 36 (such as a data entry system of the financial institution, an email based form or a web-based system associated with system 20) which is forwarded to system 20. Or, if the first and second accounts are at same financial institution, this information may already be available in data entry system 36. In either such a case, the client authorization form can be paper-based and can be faxed to system 20 by the CSR or can be scanned and forwarded electronically to system 20 or the client authorization form can be electronic (pen-based computing) and the client's signature captured from an electronic signature tablet, etc. and forwarded appropriately to system 20.

At system 20, a client record, including an image of the client's signature from the authorization form or a copy of any other proof of the client's authorization (audio recording, PIN number confirmation, etc.), is created at step 212 from the initial information. If the initial information has been faxed to system 20, from a fax machine 24, the fax is preferably received at a fax modem 28 and forwarded to a data cross referencing (DCR) system 32 wherein the client record is created and can be verified and further processed as described below.

Alternatively, the received fax can be printed by a conventional fax machine (not shown) and a client record manually created in DCR system 32 with the associated initial information by a keypunch operator.

The construction of DCR system 32 is not particularly limited and can comprise one or more personal computers connected within system 20 via a local area network and/or the internet and executing the Microsoft Windows XP operating system and an appropriate database program such as Microsoft Access, Oracle, etc.

If the financial institution has forwarded the initial information via a data entry system 36, DCR 32 will use the forwarded information to create the client record with the appropriate data fields being automatically populated from the provided initial information.

To complete the creation of the client record at step 212, if authorization has been obtained from an authorization form, the signature of the client from the authorization form is added to the client record as a digital image for use as described below. If the client authorization form was faxed to system 20 and the fax was received at fax modem 28, the portion of the fax image with the client's signature is copied into the client record by DCR 32. If another form of authorization was employed, such as an audio recording or an input PIN number, this authorization information is copied into the client record.

If the initial information was received and printed at a conventional fax machine, the portion of the client authorization form with the client signature can be scanned and the resulting image stored in the client record. The present invention is not limited to these methods of obtaining an image of the client's signature or other proof of authorization and any other suitable method of obtaining an image of the client's signature or a copy of proof of the client's authorization for the client record can be employed, as will be apparent to those of skill in the art.

Preferably, the information in the client record of DCR system 32 created at step 212 is verified and/or corrected prior to creation of a documentation package for the client at step 216. Preferably, an operator can access the client record created at step 212 to verify and correct, if necessary, at least some of the information in the client record. For example, DCR system 32 can have access to a database of financial institutions including their addresses and transit numbers, or other related clearing information, a database of postal codes or zip codes, etc. These databases can then be used to verify the initial information provided for the client record and incorrect entries can be corrected, if possible, or flagged to be brought to the attention of the client to be subsequently corrected.

From the client record, the required documentation package for the client is determined at step 216. The documentation package required by a client can vary based upon the geographic location of the client (different legal requirements may exist in different states, provinces and/or countries), the identity of the financial institution offering the second account (the financial institution may wish to provide the client with information about alternative services and/or provide additional marketing materials), etc.

At step 220, as determination is made as to whether the client has indicated that their preferred interaction method is paper-based. If the preferred interaction method is paper-based, at step 224 the determined documentation package is printed and forwarded to the client at an address specified by the client in the client information, or the package can be emailed to the client with the documents in an electronic format, such as Adobe's PDF format or the like, and the method continues as shown in the flow chart of FIG. 3.

Figure 4:
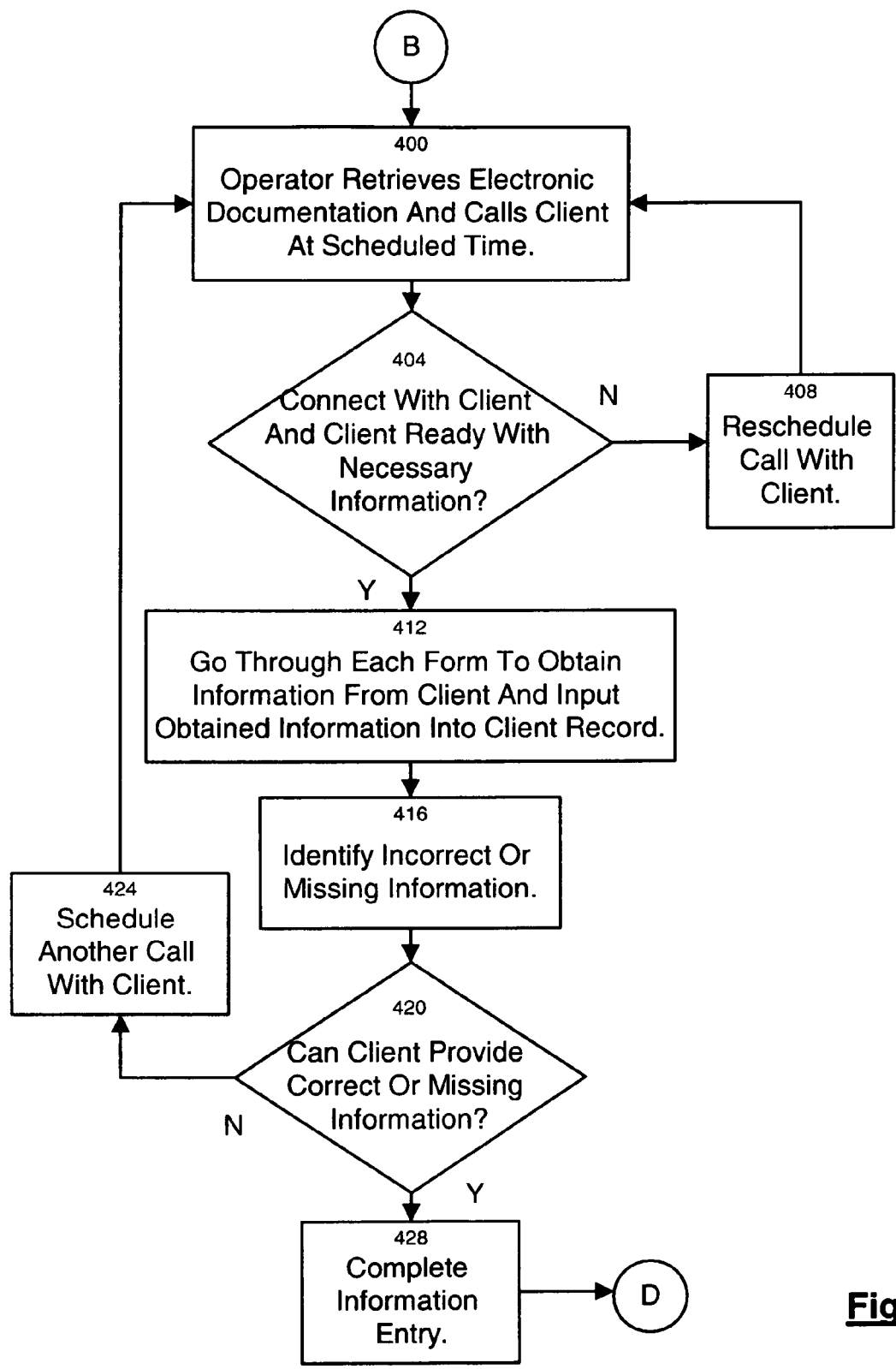
FIG. 4 shows a flowchart illustrating steps of the method of the present invention wherein the client interacts with the method and system via a telephone-based interaction.

Otherwise, at step 228, a determination is made as to if the client has indicated that their preferred interaction method is telephone-based. If the preferred interaction method is telephone-based, the documentation package is stored electronically and the client's record is scheduled for a telephone contact attempt by a service representative of system 20 according to one or more preferred contact times, indicated by the client in the initial information, and the method continues as shown in the flowchart of FIG. 4.

If the client's preferred interaction method is web-based, at step 236 the document package is created as a set of html or XML forms or the like and an access account is created for the client on a web server 40, connected to the internet 42, of system 20. Preferably, if the client selected a web-based interaction method with the DCR at step 200, the DCR provided the necessary information for the client to login to web server 40 although any other suitable method of providing the necessary login information to the client can be employed as will occur to those of skill in the art.

The construction of web server 40 is not particularly limited and can comprise a personal computer connected within system 20 by a local area network and executing an appropriate operating system, such as Linux or Microsoft Windows 2000 Server, and a web server application such as Apache server, etc.

Figure 5:
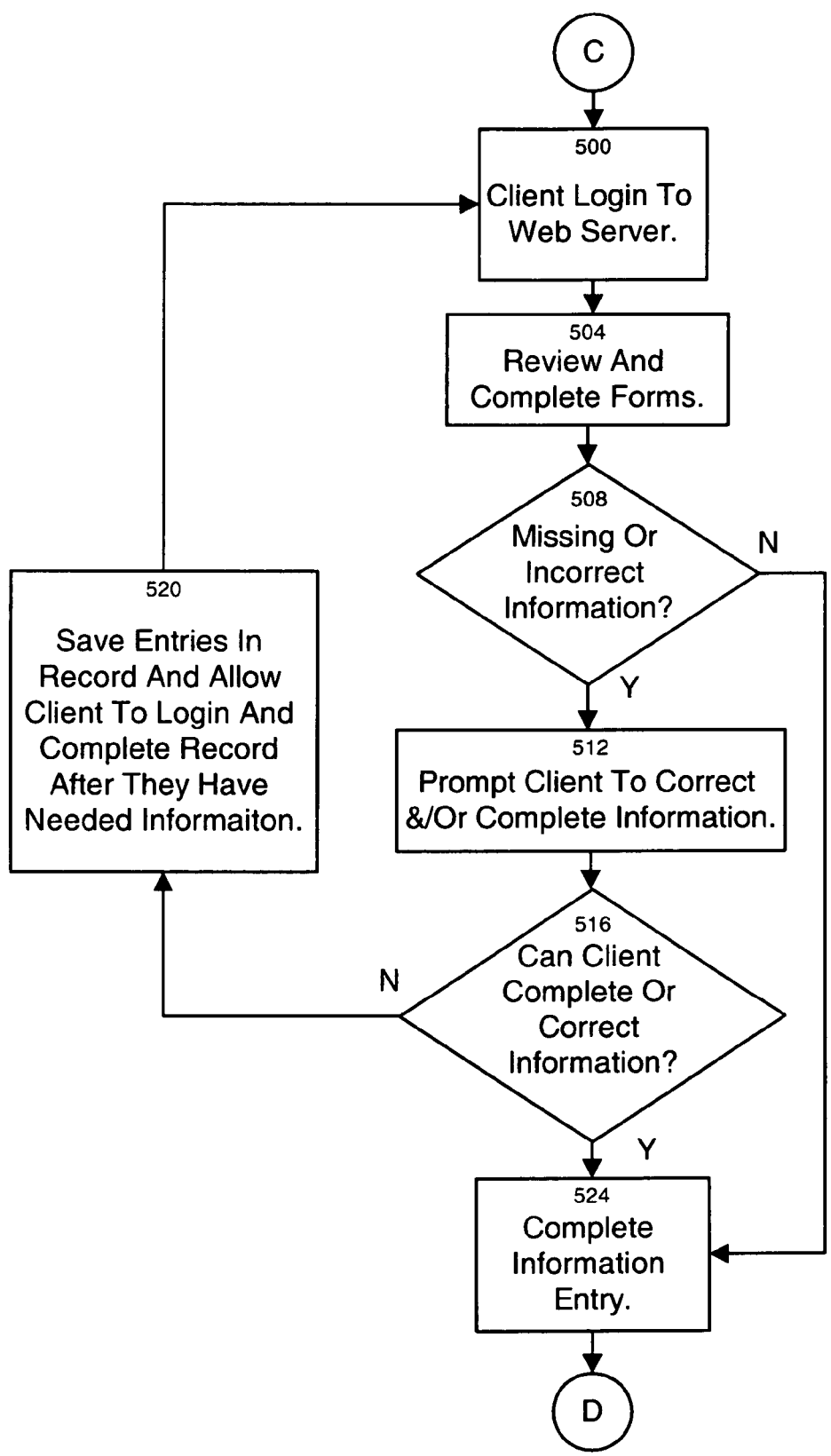
FIG. 5 shows a flowchart illustrating steps of the method of the present invention wherein the client interacts with the method and system via a web-based interaction.

As will be apparent to those of skill in the art, secure access to the document package for the client should be provided and thus the necessary information provided to the client will typically include information such as a login password and account identifier or the like and secure protocols such as https, etc. can be used for the connection. The process then continues as shown in the flowchart of FIG. 5.

Figure 3:
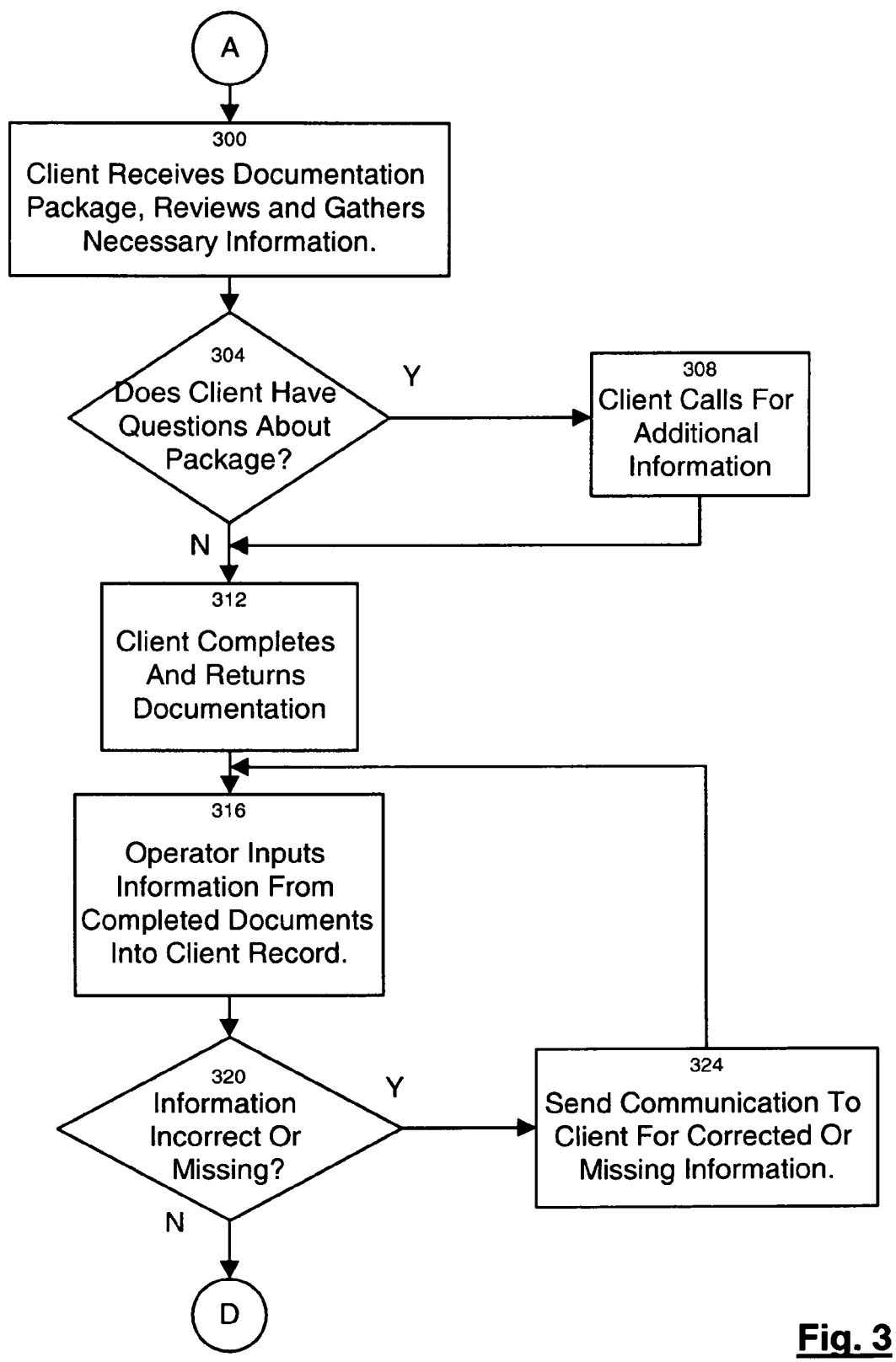
FIG. 3 shows a flowchart illustrating steps of the method of the present invention wherein the client interacts with the method and system via a paper-based interaction.

FIG. 3 shows the steps of the method of the present invention wherein the client has received the printed, paper-based, package dispatched in step 224. At step 300, the client receives the documentation package, reviews its contents and gathers the information the client will required to complete the documents. Generally, these documents require the client to provide the relevant details of each service which is to be transferred to the second account. These relevant details can include identifying the provider of the service, providing the information necessary to identify the client to the service provider, such as any relevant account number, employee number, ID number, etc. and the dates on which their associated transactions occur. Part of the documentation package provided to the client can include a checklist of common, and less common, services which the client may wish to transfer to the financial institution offering the second account including utilities payments, municipal tax payments, IRA or RRSP deposits, rent or mortgage payments, loan payments, automotive lease payments, payroll deposits, etc. to help the client ensure that all desired services are transferred.

It is contemplated that, if the services are being transferred between accounts at the same financial institution, or between cooperating financial institutions, the financial institution from which the services are being transferred can provide, electronically to system 20, an identification of the services, and the related required information, of which the financial institution is aware. In this case, the client documentation package can be pre-populated with these services and their related information to reduce the amount of information that must be gathered by the client.

At step 304, a determination is made by the client as to whether they have questions regarding the required information and/or how to complete the documents. If the client does have such questions, at step 308 the client can use a telephone number, or email address, etc., provided as part of the documentation package to contact either the financial institution or the third party operating system 20 for answers to the questions.

Once the questions have been answered, or if there were no questions at step 304, the method continues at step 312 when the client completes the documents and returns them, either to the financial institution offering the second account or to the third party as will be specified within the documentation package. The documents can be returned in a suitable manner, such as by mail, physical delivery, fax, etc.

At step 316, an operator 44 at system 20 inputs the information from the received documents into the client record in DCR system 32.

System 20 includes a counterparty database 48 which includes records for each counterparty that system 20 deals with. These records include a variety of information relevant to each counterparty, including information such as account identifiers, particular forms or agreed dataset formats that will be required by the counterparty to effect the change of the client's account for the counterparty, etc. The construction of counterparty database 48 is not particularly limited and can comprise one or more personal computers connected within system 20 by a local area network and executing the Microsoft Windows XP operating system and an appropriate database program, such as Microsoft Access or Oracle.

As the operator at system 20 inputs the information from the received documents at step 316, system 20 uses the information from the respective counterparty records to verify the input information. For example, system 20 automatically verifies input information, such as the format of the account identification numbers, to ensure that the client has provided correct numbers. If a five digit account number is input when the counterparty database record indicates that a six digit account number is required, system 20 will flag the discrepancy for follow up by the operator at step 320.

If at step 316 the operator is attempting to input information relating to a counterparty not yet in counterparty database 48, a temporary record can be created in counterparty database 48 for that counterparty to allow the operator to continue processing the client's information and the temporary record will be transferred by system 20 to another operator, or to the same operator at a later point in time, who will correctly complete and populate the counterparty record after contacting the counterparty or otherwise determining the relevant information for that counterparty.

At step 320 system 20 has the operator revisit the flagged data. If the operator has made an entry error, they can correct the flagged error. If the client has provided one or more pieces of incorrect information, or has omitted some required information, at step 324 a suitable communication is sent to the client asking for the client to correct the incorrect required information and/or to supply the missing information. This communication can be sent in accordance with the client's preferred method of interaction with system 20, in this specific example, the communication can be paper-based via mail, fax, etc. While one or more pieces of information are awaiting input and/or correction, further processing of the client record is deferred. When a response with the missing/incorrect information is received from the client, processing of the client record recommences at step 316.

If at step 320 all provided information is correct and/or present and there are no flagged items, the method will then process the input information as described below.

FIG. 4 shows the steps of the method of the present invention wherein the client has selected a telephone-based interaction with system 20 and the necessary documentation has been created and a telephone call scheduled at step 232.

At step 400, an operator 44 identifies that a call is scheduled for a client and the operator retrieves the electronic documentation created for that client from DCR system 32 and calls the client at the specified location 52. If, at step 404, the client is not reached, or if operator 44 reaches the client but determines that the client does not have the necessary information, operator 44 will at step 408 agree with the client to a suitable rescheduled time for the call. If at step 404 operator 44 reaches the client and determines that the client has the required information available, the method continues at step 412.

In step 412, operator 44 requests the required information, as indicated in the electronic documentation package, from the client and inputs the information received from the client into system DCR system 32. As before, as operator 44 inputs the information received from the client for each counterparty, that information is verified from counterparty database 48 at step 416.

Unlike the case of the paper-based interaction method, operator 44 can immediately request the client to check or obtain any information which is identified as being incorrect and/or which is missing. A determination is made at step 420 as to whether this information can be provided by the client during the call. If the client cannot provide this information during the call, a follow up call is scheduled with the client at step 424 and further processing of the client record is deferred.

If, at step 420, the client can provide the missing information and/or correct any incorrect information, operator 44 can complete the input process at step 428.

FIG. 5 shows the steps of the method of the present invention wherein the client has selected web-based interaction with system 20 and the necessary documentation has been created as web forms on a web server at step 236. At step 500, the client logs into web server 40 and is connected to the documentation forms prepared for the client. At step 504, the client proceeds through the series of forms, completing the information requested. As before, as the client inputs information associated with various counterparties, system 20 uses counterparty database 48 to verify the input information and flags any missing or incorrect information.

At step 508, a determination is made as to whether any information is missing or incorrect. If some required information is missing, or incorrect, the client is prompted to complete or correct the entered information at step 512, otherwise the method continues at step 524.

At step 516, a determination is made at whether the client can provide the missing and/or corrected information indicated at step 512. If the client indicates that they cannot provide corrected or missing information, at step 520 the present entries are saved in the client record and the client is advised to login again when they have obtained the missing or corrected information. The client can also be provided with a mechanism to email or telephone operator 44 if they require additional assistance or guidance to obtain the necessary information.

If, at step 516, it is determined that the client can correct or provide the missing data, the data is input by the client and the information entry is completed at step 524.

One of the perceived advantages of the present invention is the ability to better manage the client relationship during the transfer process. Specifically, it is not uncommon for a client to obtain a second account but to never complete the process of transferring services from the first account to the second account. Accordingly, the method of the present invention can include a client relationship management function which brings to the attention of the financial institution offering the second account those clients who have not completed the method steps described above within a defined time period. For example, information for a client who provides the client information discussed above with respect to FIG. 2 and who does not complete the process discussed above with respect to FIGS. 3, 4 or 5 within a specified timeframe, is forwarded to a CSR so that the CSR can contact the client, either by fax, telephone, electronic communication means or via any other suitable manner, in an attempt to encourage the client to complete the transfer process and/or to deal with any issues, concerns or difficulties the client may have with the transfer to the second account.

Figure 6:
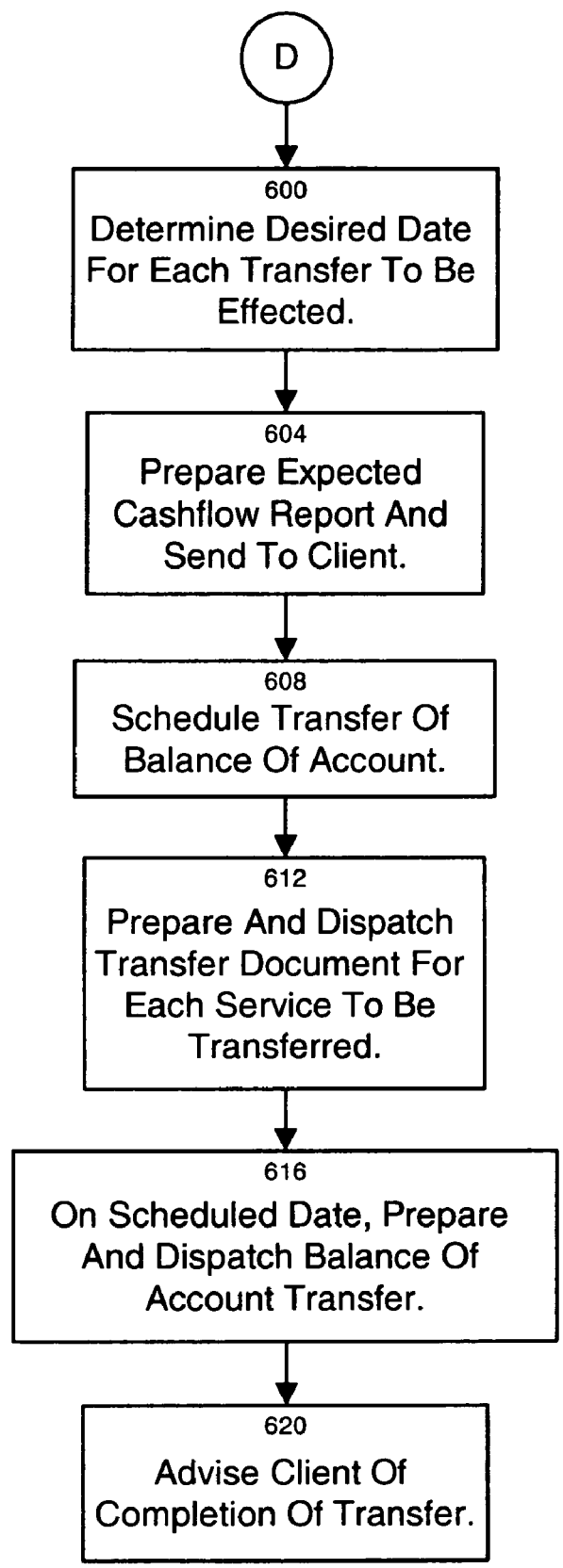
FIG. 6 shows a flowchart illustrating the steps of the method effecting the transfer of services.

FIG. 6 shows the steps of the method after the necessary information has been obtained from the client, either by paper-based interaction, telephone call-based interaction or web based interaction. Specifically, at step 600 a cashflow engine 56 examines the services of the client which are to be transferred and determines the cashflows in the first account and the cashflows in the second account which will result as services are transferred. As part of this cashflow analysis, cashflow engine 56 considers the billing cycle, or equivalent, date for each service to be transferred from the first account to the second account, as well as any required lead time the counterparty requires to effect a transfer. This information is preferably maintained as part of the information maintained in counterparty database 48 for each counterparty. From this analysis, cashflow engine 56 determines desired dates for each transfer to be effected which will avoid, where possible, undesirable cashflow spikes or interruptions in both the first account and the second account.

The construction of cashflow engine 56 is not particularly limited and can comprise one or more personal computers connected within system 20 via a local area network and executing an operating system such as Microsoft Windows XP.

In addition to determining the desired dates for the transfers, at step 604 cashflow engine 56 also prepares a cashflow report for the client, showing the expected resulting cashflows in the first account and the second account and, preferably, this cashflow report also provides a clear indication to the client as to when the transfer of each service is expected to occur.

The cashflow report is sent to the client, via the appropriate interaction method, such as a paper-based (fax transmission) report, an email report or a web-based report. The client can use this cashflow report to manage the balances in their previous and new accounts during the transition state as the services are being transferred between the first account and the second account.

If a payroll deposit is one of the services which is being transferred between the previous account and the new account, the cashflow report can suggest the best time to effect the payroll deposit transfer and can indicate any specific transfers of funds which the client will need to make to cover the cashflows during the transition period.

System 20 can also effect the transfer of the balance remaining in the first account to the second account once all of the transfers of services have been completed. At step 600, cashflow engine 56 determined a desired date for each transfer to be effected and thus system 20 knows the date by which all transfers should be completed. At step 608, system 20 schedules the transfer of the balance of the first account for a date after the expected date by which all the transfers are to be completed. Specifically, the client record in DCR system 32 has an entry added to it indicating that a balance of account transfer should be initiated by the indicated date.

At step 612, a transfer engine 60 of system 20 accesses the completed client record in DCR system 32 and prepares a transfer document for each service to be transferred from the first account to the second account. Specifically, for each counterparty providing a service which is to be transferred, an appropriate transfer document is created by transfer engine 60.

The particular transfer document created by transfer engine 60 for a counterparty can be a generic, letter-type document which has been previously used successfully with the particular counterparty or can be a document which has been agreed to be accepted by the counterparty or can be a custom form of the counterparty previously provided to system 20, or any other suitable document. The image of the client's signature from the authorization form, or the other proof of authorization by the client, which is stored in the client record of DCR system 32 is appended to each transfer document by transfer engine 60 to provide the necessary authorization to each respective counterparty.

As will be apparent to those of skill in the art, transfer documents can also be electronic documents and/or datasets of pre-agreed format which can be transferred electronically to the counterparties.

The construction of transfer engine 60 is not particularly limited and can comprise one or more personal computers connected with system 20 via a local area network and executing an operating system such as Microsoft Windows XP.

Transfer engine 60 completes each transfer document with the appropriate and required information to effect the transfer to the second account, including the desired date for the transfer to be effected, and then either prints the transfer document on a printer 64, for subsequent dispatch by mail or courier service to the appropriate counterparty, faxes the document via a fax modem 68 to the appropriate counterparty, uses electronic data transfer via the Internet 42 or another communications network (not shown) or uses any other appropriate method of providing the transfer order and related information to the counterparty. Counterparty database 48 includes an indication of the preferred method for providing transfer orders to each counterparty.

At step 616, system 20 examines the client record in DCR system 32 and determines that the scheduled date for the transfer of the balance of account has been reached. Transfer engine 60 creates the necessary document to transfer the balance of account, appending the image of the client's signature from the authorization form. In a similar manner to the transfer documents prepared at step 612 the balance of account transfer document is dispatched to the financial institution offering the first account, either by printing on printer 64 and dispatch by mail, courier, or other suitable means or by fax via fax modem 68, etc.

Preferably, the method is completed at step 620, wherein system 20 advises the client that the transfer of services is complete. This notice can be provided to the client via any suitable means, including a follow-up contact by operator 48 or by email, fax, or mail.

While the discussion above refers to circumstances wherein the client is transferring services between accounts at one or more financial institutions, it is contemplated that the present invention can also be employed to re-establish services where the account information of a client needs be changed to reflect changes in the transit number or other information of the financial institution at which the accounts are located or specific information about the account needs to be changed, or if there needs to be amendments, additions or deletions made to the client's preauthorized transactions. For example, information identifying the account and/or financial institution may change as a result of a merger between to financial institutions, an amalgamation or two branches or a financial institution, etc., or for preauthorized credit card transactions, the expiry date of the credit card will need to be updated from time to time. The present invention can effectively deal with any of these circumstances and a variety of others as may occur to those of skill in the art.

The above-described embodiments of the invention are intended to be examples of the present invention and alterations and modifications may be effected thereto, by those of skill in the art, without departing from the scope of the invention which is defined solely by the claims appended hereto.

What is claimed is:

1. A method of assisting a client to transfer financial services using a first account to use a second account via a computer system, the method comprising the steps of:
   (i) registering authorization from the client to effect the transfers on the behalf of the client;
   (ii) registering an identification of the services to be transferred and the counterparty which provides each identified service;
   (iii) performing a cashflow analysis for the first account and a cashflow analysis for the second account using a processor to determine for each counterparty and each service the desired date to effect the transfer to avoid undesirable cashflow spikes or interruptions in both accounts; and
   (iv) for each counterparty, preparing a suitable transfer document to effect transfer of the respective service, each transfer document identifying the service to be transferred, the client, the second account, the desired date for the transfer and providing authorization from the client.

2. The method of claim 1 wherein step (iii) further comprises the step of maintaining and using a database of counterparties. the database inc hiding a definition of the information and forms required by the counterparty and an indication of any lead time required by the counterparty to effect a transfer.

3. The method of claim 1 wherein the cashflow analysis further provides an expected cashflow report to the client to allow the client to manage the first and second accounts during the transfers.

4. The method of claim 1 further comprising the step of having the cashflow analysis determine a date by which all services wilt he transferred from the first account and effecting a transfer of the balance of the first account to the second account after the determined date.

5. The method of claim 1 further comprising:
   (v) dispatching each prepared transfer document to the respective counterparty.

6. The method of claim 1 wherein the first account is offered by a first financial institution and the second account is offered by a second financial institution.

7. The method of claim 1 wherein the first account is offered by a first branch of a financial institution and the second account is offered by a second branch of the financial institution.

8. The method of claim 1 wherein the first and second accounts are offered by the same financial institution, the first account being a different type of account than the second account.

9. The method of claim 1 wherein the authorization from the client in at least one transfer document is a digital reproduction of the signature of the client.

10. The method of claim 1 wherein the authorization from the client in at least one transfer document is a confirmation of a PIN identifying the client.

11. The method of claim 1 wherein the authorization from the client in at least one transfer document is an audio recording of the client authorizing the transfer.

12. The method of claim 1 further comprising the step of identifying, any client who commences the method but does not complete step (ii) within a selected time period and providing information to a representative of the financial institution offering the second account to allow the representative to contact the identified client.

13. A system for assisting a client to transfer financial services using a first account to a second account, comprising:
   a data cross referencing system operable to receive and maintain information identifying the client, the first account, the second account, the services to be transferred and the authorization of the client to effect the desired transfers;
   a counterparty database operable to maintain and provide counterparty information regarding the counterparties providing each service to be transferred for the client, the counterparty information identifying the information required by the respective counterparty to effect a transfer and an indication of any mandatory lead time required by the counterparty to effect a transfer, the data cross referencing system accessing the counterparty database to verify information received from the client relating to each service to be transferred;
   a cashflow engine stored on a computer operable to examine each service to be transferred and the date the service debits or credits the account of the client, the cashflow engine determining for each service to be transferred a desired date for the transfer to be effected, the determined date being selected to avoid undesirable cashflow spikes or interruptions in both the first account and the second account; and
   a transfer engine stored on a computer operable to create the transfer information required by each respective counterparty to effect the desired transfers, the transfer information being populated by the transfer engine with the appropriate information from the data cross referencing system and the desired date determined by the cashflow engine and the authorization received by the data cross referencing system from the client, and to dispatch the created transfer information to the respective counterparties.

14. The system of claim 13 wherein the transfer information comprises a paper form.

15. The system of claim 13 wherein the transfer information comprises an electronic dataset.

16. The method of claim 5 wherein at least one transfer document is an electronic document and is forwarded to the counterparty via electronic delivery.

* * * * *